Feb. 10, 1931. C. C. ABBOTT 1,792,208
FLUID HANDLING APPARATUS
Filed Jan. 30, 1926 2 Sheets-Sheet 1

Inventor
Corwin C. Abbott
By Maréchal and Fehr
Attorneys

Feb. 10, 1931. C. C. ABBOTT 1,792,208
FLUID HANDLING APPARATUS
Filed Jan. 30, 1926   2 Sheets-Sheet 2

Inventor
Corwin C. Abbott
By Maréchal and Fehr
Attorneys

Patented Feb. 10, 1931

1,792,208

UNITED STATES PATENT OFFICE

CORWIN C. ABBOTT, OF CONNERSVILLE, INDIANA, ASSIGNOR TO THE P. H. & F. M. ROOTS COMPANY, OF CONNERSVILLE, INDIANA, A CORPORATION OF INDIANA

FLUID-HANDLING APPARATUS

Application filed January 30, 1926. Serial No. 84,921.

This invention relates to fluid-handling apparatus and more particularly to apparatus adapted for metering gases or other fluids.

One of the principal objects of the invention is to provide gas-handling apparatus having means for flushing and sealing the impellers within the impeller housing.

Another object is to provide a meter in which slippage is reduced to a negligible quantity.

Other objects of the invention will appear from the following description taken in connection with the accompanying drawings, in which like characters of reference refer to like parts.

In the drawings Fig. 1 is a side view of a metering apparatus, certain parts being broken away for clearness in illustration;

Figure 1:
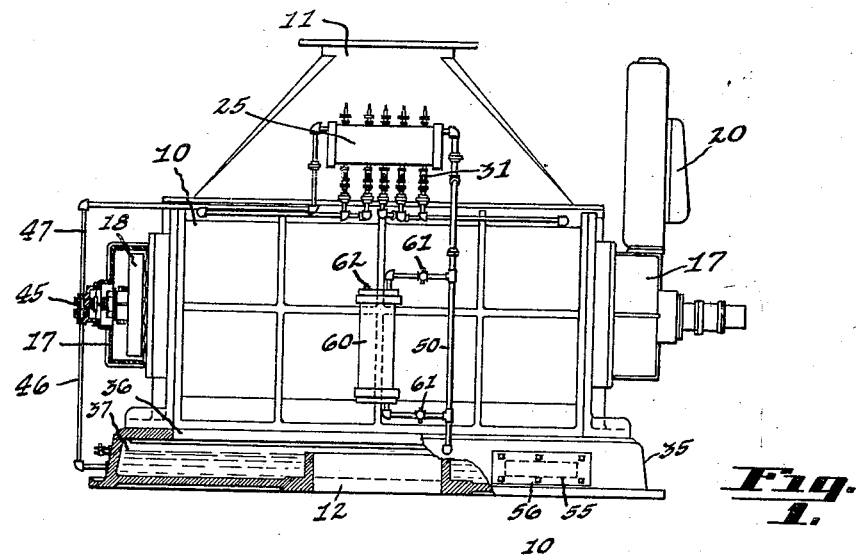
Figure 2:
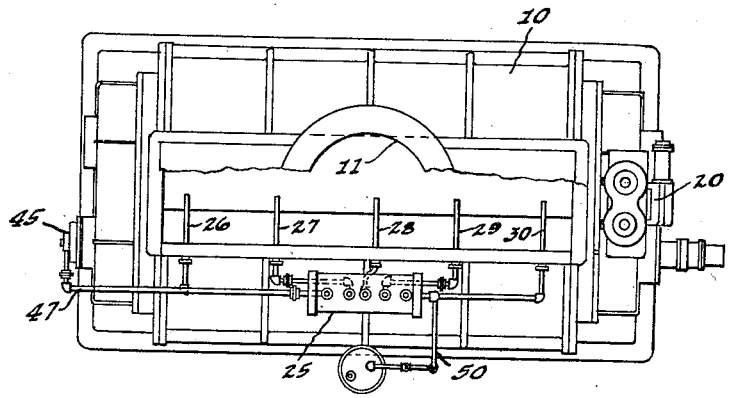
Fig. 2 is a plan view of the metering device shown in Fig. 1, a part being broken away to illustrate details of construction.
Figure 3:
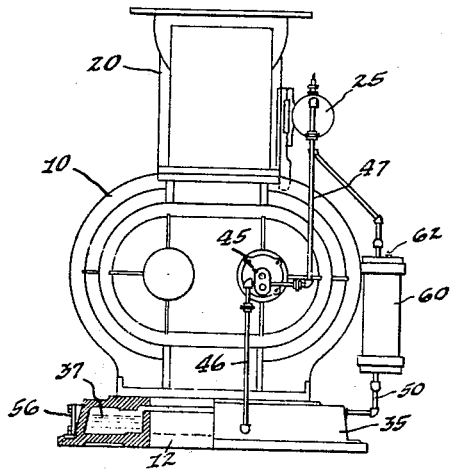
Fig. 3 is an end elevation view of Fig. 1, part being shown in section.
Figure 4:
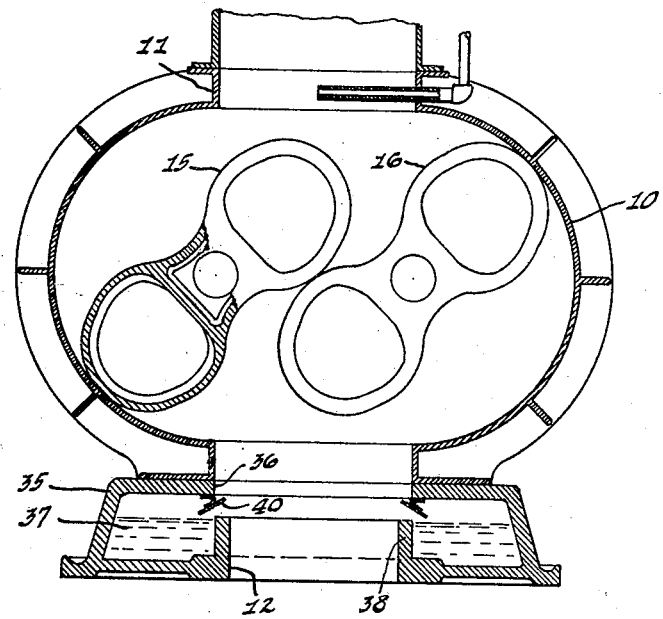
Fig. 4 is a fragmentary transverse sectional view of the apparatus.

In the accompanying drawings there is illustrated, as a preferred embodiment of the invention, a gas-handling apparatus of the type adapted to meter gas.

Referring to the drawings 10 designates an impeller housing having a gas inlet at 11 and a gas outlet at 12. Rotatably mounted within the housing 10 and journaled in the end plates thereof are rotors 15 and 16 of the lobed type. Such rotors are well known in the art and need not be described in detail. Suffice it to say that the rotors 15 and 16 at all times maintain close contact, or near close contact, with one another and with the rotor housing in order to close the housing against the passage of gas from the inlet 11 to the outlet 12 except by the rotation of the rotors 15 and 16. Such rotors are preferably so constructed and mounted that they will rotate in response to but a slight differential in pressure across them, i. e., a slight drop in pressure from the inlet 11 to the outlet 12, and preferably also, the rotor shafts are connected by suitable means such as gearing to cause them to rotate in timed relation. As shown these gears are in pairs, at each end of the shafts on which the rotors are mounted, and are enclosed in suitable housings 17. One of the gears is shown in outline at 18. Other timing gear arrangements may be used as desired. The meter is provided with suitable means indicated generally at 20 which is geared or otherwise operatively connected to one of the rotor shafts for indicating the amount of gas passing through the meter. The foregoing features are, for the most part, of well known construction and need not, therefore, be further described.

Meters of the herein described type, have, of necessity, a slight clearance between the rotors and the interior of the housing in order to eliminate friction between these parts, and hence inaccuracies in the metering. It not infrequently happens that tar or other foreign matter carried by the gas which enters the meter adheres to the rotors and rotor housing and perhaps hardens thereon thereby introducing friction between the parts and causing the meter to become inaccurate or to seriously interfere with its operation. In addition such accumulations are sometimes sufficient to cause the rotors to stick or pound together which has a very detrimental effect upon the bearings. Also such impurities tend to work into the bearings, and gears, and to damage these parts. When the rotors and the interior of the housing are free from such foreign matter, the clearance between the impellers and the housing permits a certain leakage of gas from the inlet side to the outlet side of the meter, which leakage is commonly known as "slippage". The amount of slippage for a given clearance will vary with variations in the differential pressure across the rotors, and it is the general practice to use compensating means or other devices in connection with the indicating means 20 for giving directly a correct indication of the amount of gas passing through the meter, or for indicating the corrections needful for reaching an accurate determination. But with varying clearances due to varying accumulations of impurities even such compensating devices give only an approximation of the correct reading—and the actual amount of gas passed may be either more or less than the reading shown. And this discrepancy cannot be determined by the compensating instruments.

The present invention contemplates the circulation of a flushing and sealing liquid into the meter housing for flushing and sealing the rotors. The flushing and sealing liquid introduced may be of such a character as to seal the space or clearance between the rotors and the interior surface of the housing against leakage or slippage and also to flush the working surfaces so as to prevent the deposition and hardening thereon of the undesirable foreign matter which is likely to interfere with the operation and accuracy of the meter, and also to wash out any harmful impurities in the gas which might injure the rotors and rotor housing.

According to one method of carrying out the present invention there is mounted in an elevated position above the housing proper, a tank 25 adapted to contain a quantity of flushing and sealing liquid. Extending from the lower part of the tank 25 are a plurality of distribution pipes or conduits 26, 27, 28, 29, and 30 which extend through the wall of the gas inlet opening 11; five of these pipes being shown though the number may be varied to meet actual conditions. These distribution pipes preferably terminate approximately at the center line of the rotor housing to discharge the flushing and sealing liquid onto the rotors 15 and 16 as they revolve in the housing, and such distribution pipes may be provided with sight-feed devices such as indicated at 31 and also with suitable valves to control the rate of flow of the sealing liquid to the interior of the housing. This location of the discharge ends of the pipes has been found to give very satisfactory and uniform distribution of the flushing and sealing liquid within the rotor housing; but suitable results may be secured by introducing the sealing liquid at other points in the apparatus. The sealing and flushing liquid supplied to the rotors is distributed over the surfaces of the rotors and carried to the inner surface of the housing 10 and serves not only to seal the meter against slippage but also to prevent the accumulation of deposits of tar or other material upon the working parts. The meter housing is mounted upon a hollow bed plate 35 having a top opening 36 of substantially rectangular shape corresponding with the outlet from the meter housing, an upturned flange 38 providing a central opening for the discharge of the gas passing through the meter. The bed plate 35 constitutes a reservoir for the flushing and sealing liquid which is indicated at 37 and also functions as a trap for the recovery of sealing and flushing liquid from the meter housing. To facilitate the recovery of the sealing liquid there is secured along each of the longitudinal side edges of the opening 36 a sheet-metal-drip plate 40 which is adapted to intercept the sealing liquid which escapes from the lower part of the meter housing and to divert the same into the sump formed by the bed plate. The plates may be extended to catch any sealing liquid thrown off from the rotors during operation.

Mounted upon the end of the meter housing and driven by one of the rotor shafts is a pump 45 the inlet side of which is connected through pipe 46 with the sump in the bed plate 35, and the outlet side of which is connected through pipe 47 with the tank 25. The purpose of this pump is to continuously pump sealing liquid from the sump to the tank 25 to maintain an adequate supply within the tank. An overflow pipe is provided at 50 whereby any excess of sealing and flushing liquid pumped through the tank 25 by the pump 45 may be returned to the sump in the bed plate 35. The pump herein illustrated is a pump of well known construction but it will be understood that any other suitable or desirable form of pump may be employed,—as, for example, a reciprocating piston pump, which would also be preferably driven from the rotor shaft.

Any suitable sealing and flushing liquid may be employed such for example as machine oil or drip oil obtained from the gas lines of gas houses or some hydrocarbon oil which has the property of cutting naphthalene and the like in gas systems and mains.

In order to prevent the necessity of shutting down operation of the apparatus to add additional sealing and flushing liquid, a drum or filling tank 60 is connected to the overflow pipe 50, suitable shut off valves 61 being provided in the connection pipes so that this drum may be disconnected from the sealing and flushing system. A filling opening closed by a plug 62 is provided. By this arrangement the drum may be disconnected from the pipe 50, the plug 62 removed, the drum supplied with replenishing liquid, then the plug 62 reinserted and the valves 61 opened to feed the liquid in the drum into the flushing and sealing system.

The present invention provides a simple and reliable means for continuously circulating sealing and flushing liquid to the interior of a fluid-handling apparatus in such wise as to seal the same against slippage or to reduce slippage to a negligible quantity. The sealing and flushing liquids employed also prevent the deposit and hardening of tar or other foreign materials upon the impeller blades and upon the interior of the meter housing to interfere with the proper operation of the meter. One advantage of the present invention resides in the fact that due to the substantial reduction, if not the elimination of slippage, complicated and expensive compensating mechanism associated with the measuring device or indicator 20 may be eliminated, thus effecting a saving in the cost of the meter. Still another advantage lies in the increased reliability in operation due to the prevention of undesirable deposits upon the rotors and within the meter housing.

In order to facilitate the removal of the sealing and flushing liquid as well as to remove any deposits of tar which may collect in the sump, the bed plate 35 may be provided at a number of places with clean-out holes 55 having removable cover plates 56. Such clean-out holes are preferably of such a size as to admit a scraper for scraping out of any heavy deposits which may have collected in the sump.

Figure 5:
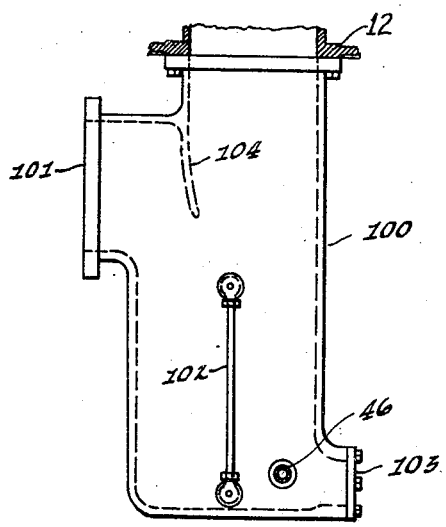
Fig. 5 is a somewhat modified view showing a trap below the apparatus for collecting the flushing and sealing liquid from the gas.

In Fig. 5 is shown a modified form of arrangement in which a trap 100 is inserted in the outlet main below the meter by direct attachment to the bed plate or any other desired manner. This trap has an outlet 101 through which the gas passes to the delivery main and a suitable baffle, one form of baffle being shown at 104. A gauge 102 to indicate the quantity of liquid in the trap is provided; and a clean-out plate 103 is bolted, or otherwise secured, at the bottom of the trap. Where this trap is used the intake pipe 46 for the pump would be connected to the lower part of the trap as shown and the sump in the bed plate might be then dispensed with if desired.

While the forms of apparatus herein described constitute preferred embodiments of the invention, it is to be understood that the invention is not limited to these precise forms of apparatus, and that changes may be made in either without departing from the scope of the invention which is defined in the appended claims.

What is claimed is:

1. A fluid-handling apparatus, comprising a housing having an inlet at the upper end thereof and an outlet at the lower end thereof, a pair of intermeshing rotary members mounted within said housing between said inlet and said outlet, and means for continuously supplying a flushing and sealing liquid to the interior of said housing above said intermeshing rotary members while the apparatus is operating, whereby said flushing and sealing liquid flows downwardly through said housing in the direction of flow of fluid through said apparatus to seal the intermeshing rotary members and the housing and to prevent the deposit of impurities upon the same.

2. A fluid meter comprising a housing having an inlet at the upper end thereof and an outlet at the lower end thereof through which fluid to be metered is adapted to pass, a pair of lobed rotary members mounted within said housing between said inlet and said outlet and adapted to be actuated by the fluid passing therethrough, said lobed rotary members being spaced from each other and from said casing to provide a slight clearance through which slippage of fluid being metered tends to occur, and means for supplying a flushing and sealing liquid to the interior of said housing above said lobed rotary members, whereby said flushing and sealing liquid flows downwardly in the direction of travel of the fluid being metered through said housing to form a seal within said clearance space and to wash the surfaces of the lobed rotary members and the housing to prevent the deposit of impurities thereon.

3. A fluid-handling apparatus comprising a housing, intermeshing rotors mounted therein, and means for supplying a flow of flushing and sealing liquid to the interior of said housing, said means including a retainer for a supply of flushing and sealing liquid, and a plurality of pipes for conveying flushing and sealing liquid from said retainer to the interior of said housing and provided with means for discharging the same at a plurality of spaced apart points within the housing and onto the rotors therein.

4. A fluid-handling apparatus comprising a housing having an inlet at the upper end thereof and an outlet at the lower end thereof, a pair of lobed rotary members within the housing between the inlet and the outlet, and means for producing a flow of flushing and sealing liquid within the housing in the same direction as the flow of fluid therethrough, said means including a supply of flushing and sealing liquid, retaining means therefor, and a plurality of pipes for conveying said liquid from the retaining means and provided with means for discharging it into the interior of said housing at a plurality of spaced apart points within the housing above the lobed rotary members therein, whereby a substantially uniform distribution of flushing and sealing liquid is obtained within the housing, said liquid flowing downwardly within the housing to seal the lobed rotary members and housing and to prevent the deposit of impurities thereon.

5. A fluid-handling apparatus, comprising a housing having inlet and outlet openings therein, one of said openings extending downwardly from said housing, a rotor mounted in said housing, means for supplying a flushing and sealing liquid to the interior of said housing, whereby said flushing and sealing liquid flows downwardly through said housing to said opening at the lower end thereof, and collecting means positioned about the periphery of said opening at the lower end of said housing to collect the flushing and sealing liquid flowing down through said opening and separate it from the other fluid passing through said opening.

6. A fluid-handling apparatus comprising a housing having an inlet at the upper end thereof and an outlet at the lower end thereof, a hollow base for said housing, said base having an outlet opening therethrough in alignment with said outlet in the housing, rotors mounted within the housing, and means for producing a continuous flow of flushing and sealing liquid within the interior of said housing during operation of the apparatus, said means including a reservoir containing a flushing and sealing liquid within said hollow base, a pump for pumping the liquid from said reservoir and for introducing the liquid into the interior of said housing above said rotors, whereby said flushing and sealing liquid flows downwardly through said housing, and means associated with said outlet opening within said base for recovering said flushing and sealing liquid and for returning the same to said reservoir within said hollow base.

7. A fluid-handling apparatus comprising a housing, rotors mounted therein, and means for supplying a flow of flushing and sealing liquid to the interior of said housing, said means including a reservoir containing a flushing and sealing liquid, a supply tank positioned at an elevation above that of said rotors, a pump for pumping liquid from said reservoir to said supply tank, an overflow pipe for said supply tank, and means for conveying liquid from said supply tank and introducing it into the interior of said housing onto the rotors therein.

8. A fluid-handling apparatus comprising a housing, a pair of lobed rotary members therein, spaced apart shafts for said lobed rotary members, and means for producing a continuous flow of flushing and sealing liquid within the interior of said housing, said means including a reservoir containing a flushing and sealing liquid, a supply tank positioned at an elevation above that of the lobed rotary members, a pump driven by one of the shafts of said lobed rotary members for pumping liquid from said reservoir to said supply tank, means for conveying liquid from the supply tank and introducing it into the interior of said housing above the lobed rotary members therein, whereby said flushing and sealing liquid flows downwardly within said housing, and means adjacent the lower end of said housing for recovering said liquid and returning the same to said reservoir.

9. A fluid-handling apparatus comprising a housing, rotors mounted therein, and a liquid system for supplying a flow of flushing and sealing liquid to the interior of said housing, said liquid system including a reservoir for a flushing and sealing liquid, a supply tank positioned at an elevation above that of said rotors, a pump for pumping liquid from said reservoir to said supply tank, means for conveying said liquid from said supply tank and introducing it into the interior of said housing, means for recovering said liquid introduced into said housing and for returning it to said reservoir, a filling tank, and valved connections between said filling tank and said liquid system, the construction being such that fresh flushing and sealing liquid may be added to said liquid system during operation of said fluid-handling apparatus.

In testimony whereof I hereto affix my signature.

CORWIN C. ABBOTT.